(12) United States Patent
Ohno

(10) Patent No.: US 6,639,744 B2
(45) Date of Patent: Oct. 28, 2003

(54) OBJECTIVE LENS ACTUATING DEVICE

(75) Inventor: Takehide Ohno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/367,827

(22) Filed: Feb. 19, 2003

(65) Prior Publication Data

US 2003/0123161 A1 Jul. 3, 2003

Related U.S. Application Data

(63) Continuation of application No. 10/011,478, filed on Dec. 11, 2001, now Pat. No. 6,532,118.

(30) Foreign Application Priority Data

Dec. 13, 2000 (JP) ......................... 2000-378492

(51) Int. Cl.$^7$ ............... G02B 7/02; G11B 7/00
(52) U.S. Cl. ........................... 359/824; 369/44.14
(58) Field of Search ................... 359/813, 814, 359/823, 824; 369/44.14, 44.15

(56) References Cited

U.S. PATENT DOCUMENTS 5,220,459 A * 6/1993 Ichikawa et al. ............ 359/811
5,663,840 A * 9/1997 Matsui ........................ 359/814
6,295,255 B1 * 9/2001 Seo et al. ................. 369/44.32

FOREIGN PATENT DOCUMENTS

JP      7-320278      12/1995
JP      9-231593      9/1997

* cited by examiner

*Primary Examiner*—Ricky Mack
(74) *Attorney, Agent, or Firm*—Dickstein Shapiro Morin & Oshinsky LLP

(57) ABSTRACT

In an objective lens actuating device, a magnetic field generating part generates a magnetic field with a focusing coil in a gap formed by an inner yoke and an outer yoke and an auxiliary magnetic field generating part generates an opposite magnetic field in respect to the magnetic field which is generated in the gap towards the focusing coil, at both ends of the inner yoke vertical to the focusing direction.

24 Claims, 9 Drawing Sheets

OBJECTIVE LENS ACTUATING DEVICE

CROSS REFERENCE TO RELATED APPLICATIONS

The present application is a continuation application of U.S. patent application Ser. No. 10/011,478 filed on Dec. 11, 2001, now U.S. Pat. No. 3,532,118, the disclosure of which is herewith incorporated by reference in its entirely.

BACKGROUND OF THE INVENTION

1. Field of the Invention

The present invention generally relates to an objective lens actuating device applied to an optical recording/reproducing apparatus and controlling a drive of an objective lens in a focusing direction and/or a tracking direction on a recording surface of a recording medium.

2. Description of the Related Art

In conventional objective lens which is used to form a fine optical spot by condensing a laser beam on a track of an optical disc at a time of recording or reproducing information, an aberration occurs in the optical spot when an optical axis of the objective lens tilts in respect to the optical disc. Thus, problems may be caused during a recording/reproducing operation. Therefore, a tilt of the objective lens is required to be as small as possible. Especially recently, a DVD (Digital Versatile Disk) has been widely marketed to users. And, the DVD for recording is also practically used. In order to improve a higher density of recording information, the objective lens is needed to have a greater number of apertures and then it is more required to prevent the objective lens from being tilted. The main factor causing the tilt of the objective lens is an uneven magnetic field in a magnetic circuit used for a focus actuator.

A conventional objective lens actuating device and focusing will now be described with reference to FIGS. 1A and 1B and FIGS. 2A and 2B. FIG. 1A and FIG. 2A are plan views of the conventional objective lens actuating device. FIG. 1B and FIG. 2B are diagrams showing a relationship between a actuating force and a magnetic flux density.

Referring to FIG. 1A and FIG. 2A, a focusing coil 3 is wound around an outside of a holder 2 holding an objective lens 1. The holder 2 is supported by two pairs of wires 5 so as to be movable in a focusing direction and in a tracking direction. That is, ends of the two pairs of wires 5 in one side are fixed to a wire supporting member 4 and other ends of the two pairs of wires 5 on another side are fixed to both sides of the holder 2.

Each of two magnetic circuits 6 is provided to both sides of the holder 2 in a direction "A" and each of air vents 8 is provided to the both sides of the holder 2 in order to insert inner yokes 7 each of which is a part of each of the magnetic circuits 6. Each of the magnetic circuits 6 includes one inner yoke 7, one outer yoke 9, and one permanent magnet 10 fixed by the outer yoke 9.

A magnetic pole surface of each of the permanent magnets 10 is arranged to face to a side surface of the focusing coil 3 in the direction "A". Both of the permanent magnets 10 are magnetized so as to face the same magnetic poles towards each other in the direction "A". Each of the inner yokes 7 is arranged to face to the outer yokes 9 and the permanent magnets 10 inside the focusing coil 3. And the focusing coil 3 is provided at each of gaps 11 between the inner yokes 7 and the permanent magnets 10. A magnetic force as the focus actuating force occurs by a magnetic field within each of the gaps 11 and a current flowing through the focusing coil 3.

Also, two pairs of tracking coils 12 are adhered to both side surfaces of the focusing coil 3 in the direction "A", in which focusing coil 3 is wound around the holder 2 in an optical axis direction of the objective lens 1 in a cylindrical shape, and totally four tracking coils 12 are fixed. In FIG. 1A and FIG. 2A, a gravity center is indicated as a gravity center G of a movable member 13.

As shown in FIG. 1A and FIG. 1B, in a case in which each component is properly arranged, the magnetic field (that is, the focus actuating force), which affects the focusing coil 3 between the gaps 11 of the magnetic circuits 6, shows a symmetric state in that a center of the movable member 13 is stronger and the magnetic field becomes weaker towards each of both sides of the movable member 13. However, as shown in FIG. 2A and FIG. 2B, when a relative displacement between the focusing coil 3 and each of the magnetic circuits 6 occurs, a moment occurs to the movable member 13 since an effect center of the focus actuating force is shifted from the gravity center G. Therefore, the objective lens 1 is tilted.

As a factor of the relative displacement between the focusing coil 3 and the magnetic circuits 6, which displacement causes the moment towards the movable member 13, an error in an initial assembly stage or a move during a tracking operation can be considered.

In order to prevent the tilt of the objective lens 1 caused by the moment occurred by the relative displacement between the focusing coil 3 and the magnetic circuits 6, the Japanese Laid-open Patent Application No. 7-320278 discloses an objective lens actuating device in which a magnetic substance is arranged at a location facing a side surface of the focusing coil 3 in the tracking direction. The Japanese Laid-Open Patent Application No. 9-231593 discloses another objective lens actuating device in that a magnet instead of the magnetic substance is arranged.

However, in such configurations of conventional technologies described above, the magnetic substance or the like is required to be arranged outside the side surface of the focusing coil 3. Thus, these configurations prevent minimizing the objective lens actuating device.

Especially, in a configuration described in the Japanese Laid-Open Patent Application No. 7-320278, the magnetic-field distribution is leveled. However, the moment at the side surface facing the magnetic substance of the focusing coil 3 is increased. Thus, a practical effect cannot be expected in the conventional objective lens actuating device.

SUMMARY OF THE INVENTION

It is a general object of the present invention to provide an objective lens actuating device in which the above-mentioned problems are eliminated.

A more specific object of the present invention is to provide the objective lens actuating device, instead of a large-sized objective lens actuating device, that prevents an objective lens from tilting by canceling a shift from a center of a movable member including the objective lens, and a holder, which shift is caused by a displacement between a focusing coil and a magnetic circuit.

Another specific object of the present invention is to provide the objective lens actuating device, instead of the large-sized objective lens actuating device, that prevents the objective lens from tilting by canceling the shift from the center of the movable member including the objective lens, and the holder, which shift is caused by the displacement caused by a movement during tracking between the focusing coil and the magnetic circuit.

The above objects of the present invention are achieved by an objective lens actuating device including: a holder holding an objective lens in a focusing direction; a focusing coil cylindrically wound in an axis parallel with an optical axis of the objective lens and fixed on the holder; an inner yoke located inside the focusing coil; an outer yoke arranged to partially sandwich the focusing coil and face the inner yoke; a magnetic field generating part generating a magnetic field with the focusing coil in a gap formed by the inner and outer yokes; and an auxiliary magnetic field generating part generating an opposite magnetic field in respect to the magnetic field generated in the gap towards the focusing coil, at both ends of the inner yoke vertical to the focusing direction.

According to the present invention, a special member is not required to mount outside the objective lens actuating device and it is possible to cancel the moment caused by the shift of the focus actuating force by a displacement caused when the focusing coil and the magnetic circuits are assembled, and by the shift of the focus actuating force by a tracking movement in the focusing coil and the magnetic circuits. Also, it is not required to enlarge the objective lens actuating device and it is possible to prevent the objective lens from being tilted.

In the objective lens actuating device, the magnetic field generating part may include a permanent magnet that is fixed on a flat surface of the outer yoke, in which the flat surface is faced to the inner yoke, and that is magnetized in a vertical direction in respect to the flat surface and the auxiliary magnetic field generating part may include both ends of the inner yoke, in which the both ends are formed to be thinner so as to saturate the magnetic field caused by the permanent magnet at the both ends of the inner yoke in a direction perpendicularly crossing the focusing direction. In this configuration, it is not required to provide an additional member such as an auxiliary permanent magnet. Thus, an additional expense is not required to achieve the objects.

Moreover, the above objects of the present invention are achieved by an objective lens actuating device including: a holder holding an objective lens in a focusing direction and in a tracking direction; a focusing coil cylindrically wound in an axis parallel with an optical axis of the objective lens and fixed on the holder; an inner yoke located inside the focusing coil; an outer yoke arranged to partially sandwich the focusing coil and face the inner yoke; a magnetic field generating part generating a magnetic field with the focusing coil in a gap formed by the inner and outer yokes; and an auxiliary magnetic field generating part generating an opposite magnetic field in respect to the magnetic field generated in the gap towards the focusing coil, at both ends of the inner yoke vertical to the focusing direction.

According to the present invention, a special member is not required to mount outside the objective lens actuating device and it is possible to cancel the moment caused by the shift of the focus actuating force by a displacement caused when the focusing coil and the magnetic circuits are assembled, and by the shift of the focus actuating force by a tracking movement in the focusing coil and the magnetic circuits. Also, it is not required to enlarge the objective lens actuating device and it is possible to prevent the objective lens from being tilted.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Preferred embodiments of the present invention will now be described.

First Embodiment

Figure 1A:
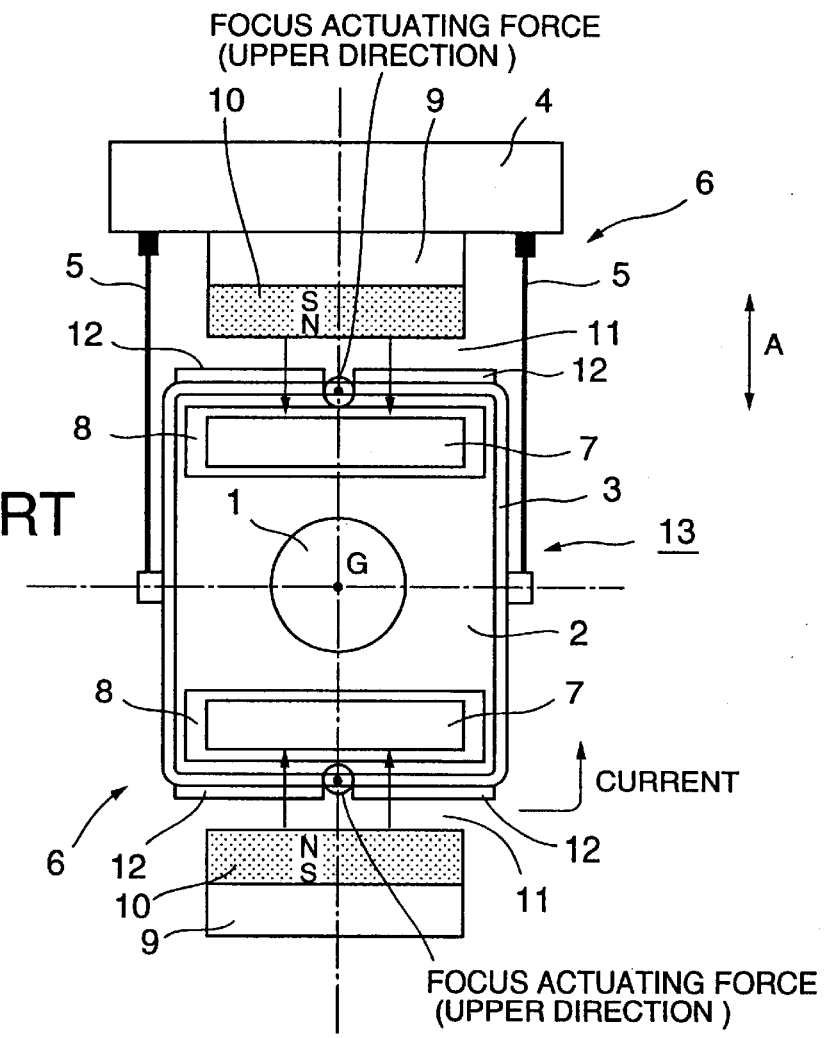
FIG. 1A is a plan view of a conventional objective lens actuating apparatus and FIG. 1B is a diagram showing a relationship between a focus actuating force and a magnetic flux density.
Figure 1B:
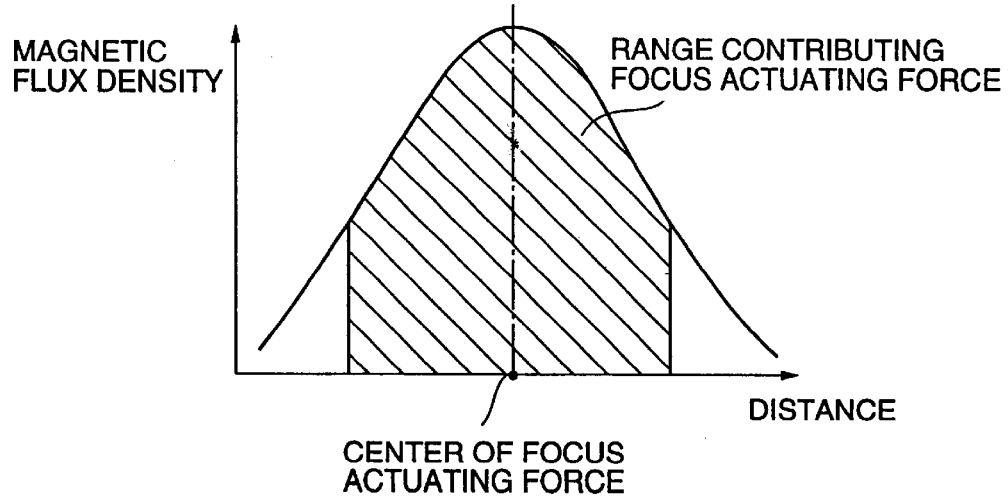
Figure 2A:
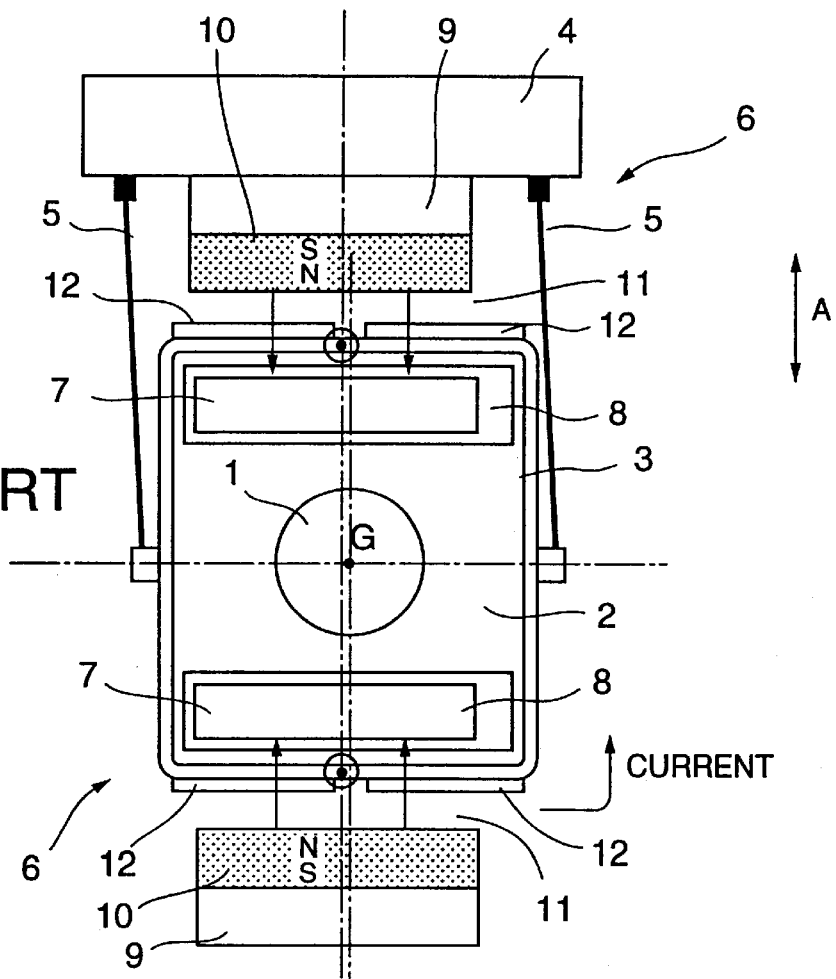
FIG. 2A is a plan view of the conventional objective lens actuating apparatus and FIG. 2B is a diagram showing a relationship between the focus actuating force and the magnetic flux density.
Figure 2B:
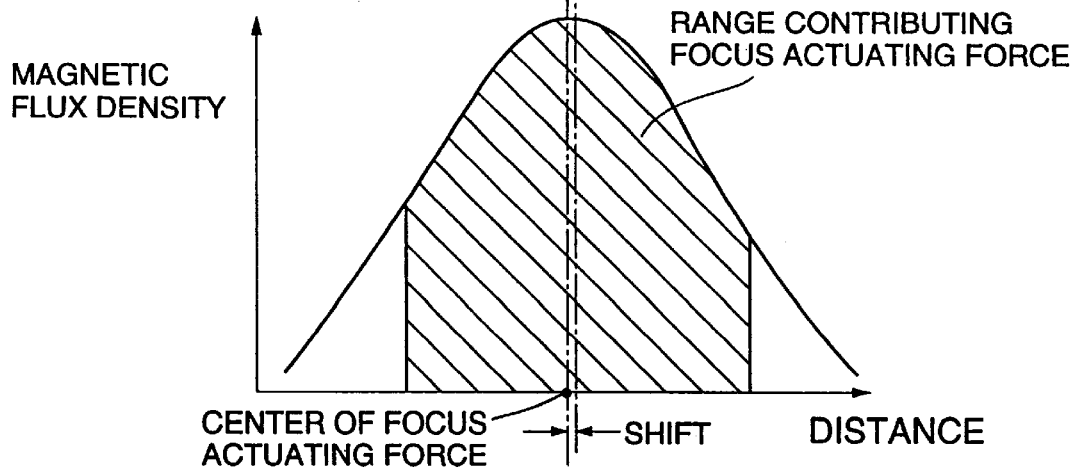
Figure 3:
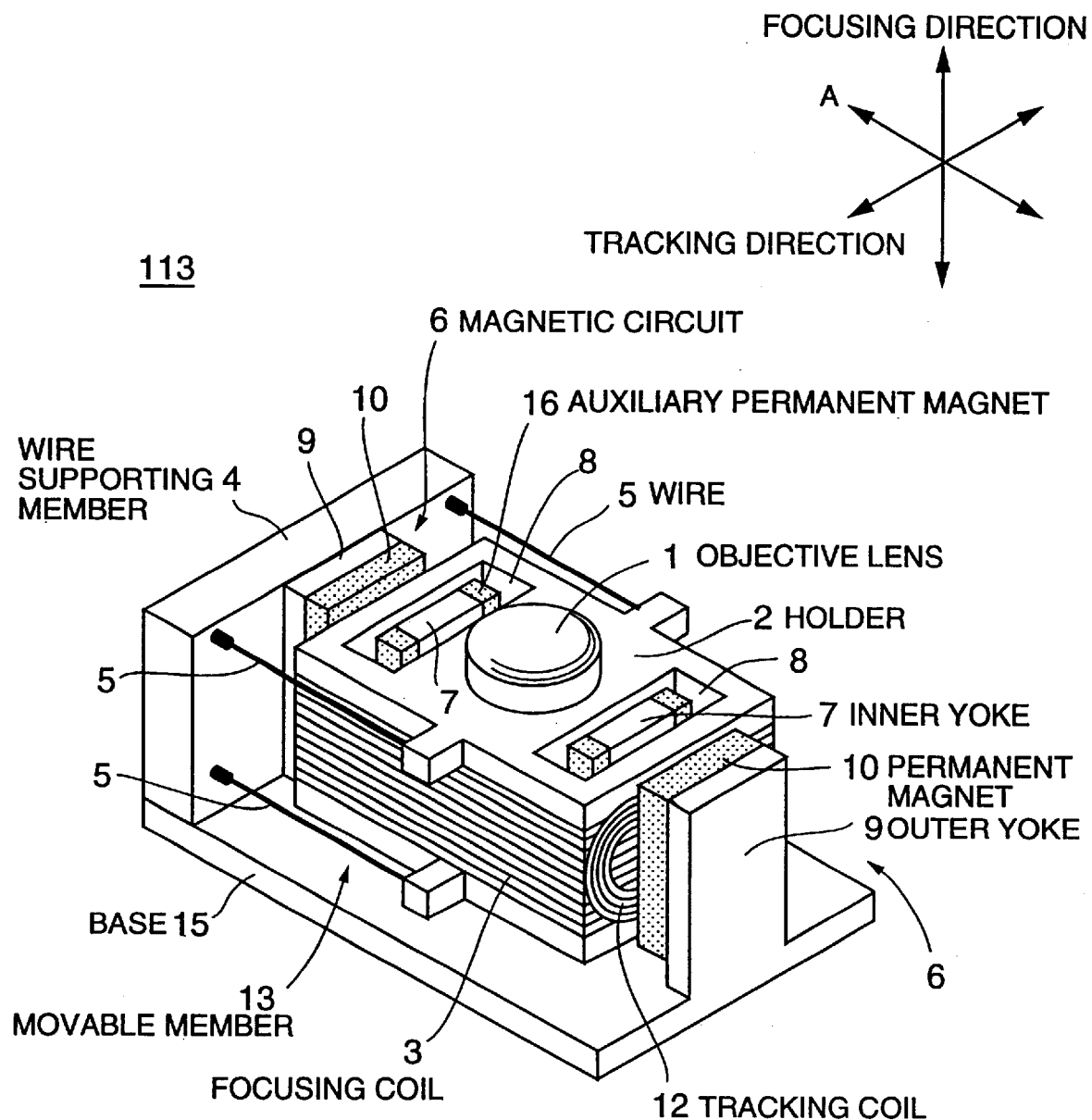
FIG. 3 is a perspective view of an entire objective lens actuating device according to a first embodiment of the present invention.
Figure 4:
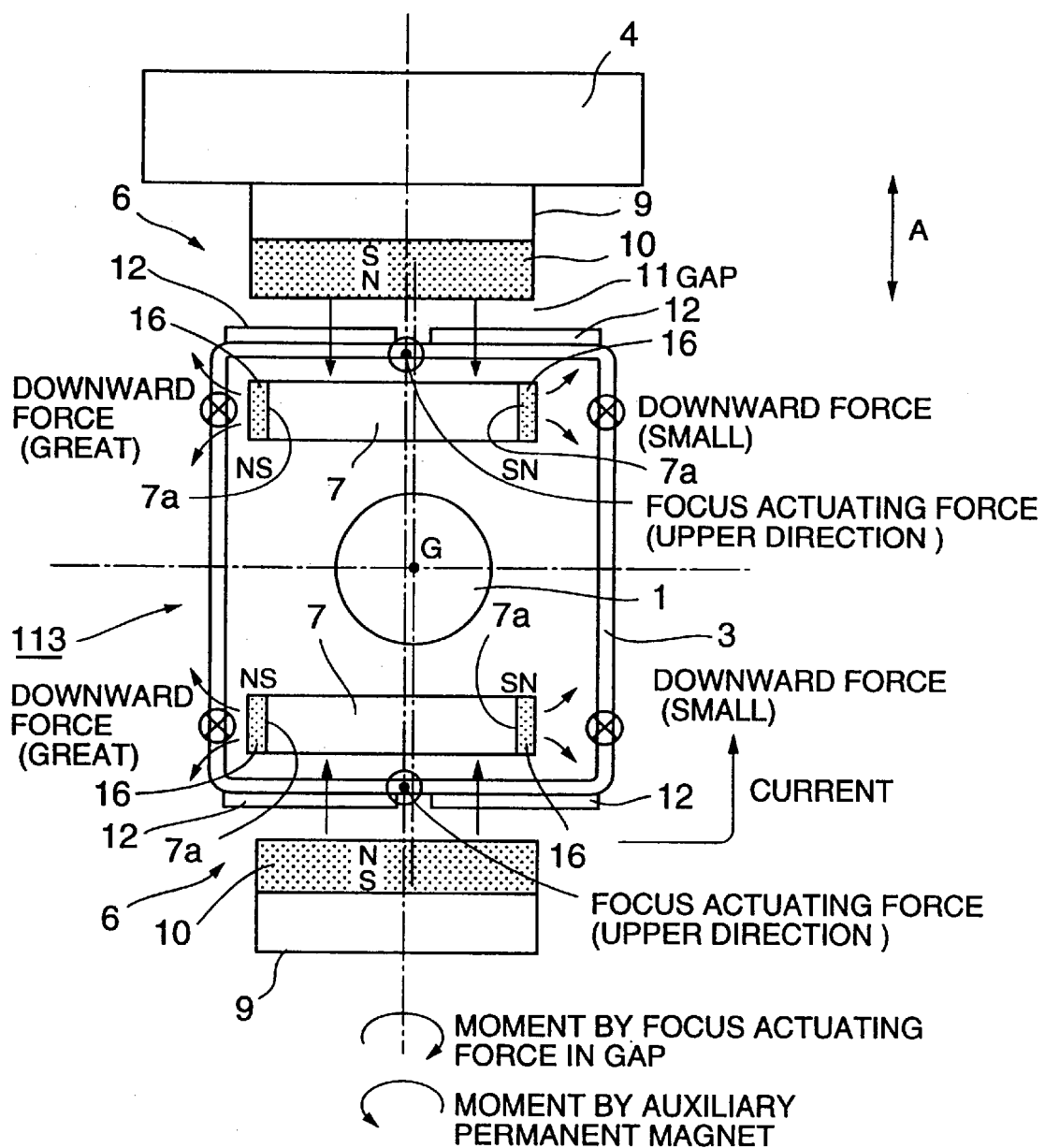
FIG. 4 is a diagram for explaining an occurrence state of the focus actuating force in a case of placing the objective lens actuating device on a flat surface.

FIG. 3 is a perspective view of an entire objective lens actuating device according to a first embodiment of the present invention. FIG. 4 is a diagram for explaining an occurrence state of a focus actuating force in a case of placing the objective lens actuating device on a flat surface. Hereinafter, parts that are the same as the ones in FIG. 1 and FIG. 2 are indicated by the same reference numerals and the explanation thereof will be omitted.

A base 15 shown in FIG. 3 includes a mechanism as a connecting member for connecting an outer yoke 9 and an inner yoke 7. A gravity center G of a movable member 113 including an objective lens 1, a holder 2, a focusing coil 3, and a tracking coil 12 passes an optical axis of the objective lens 1. And the objective lens 1, the holder 2, the focusing coil 3, and the tracking coil 12 are arranged to be symmetrical to a surface extending to the tracking direction and including the optical axis of the objective lens 1 and also to be symmetrical to a surface extending to a direction "A". Also, both magnetic circuits 6 are arranged to be symmetrical to two surfaces above, so as that a center of a actuating force affecting the movable member 113 passes the gravity center G of the movable member 113.

As describe in the Description of the Related Art, in a case in which components of the objective lens actuating device are initially displaced or the displacement between the focusing coil 3 and the magnetic circuit 6 occurs in the tracking direction when the movable member 113 moves in the tracking direction to follow an information track of the optical disc, a moment is additionally applied to the movable member 113 by a shift between an effect center of the focus actuating force and the gravity center G of the movable member 113. However, in the first embodiment, each of auxiliary permanent magnets 16 are provided to both ends of each of the inner yokes 7 in the tracking direction perpendicularly crossing the focusing direction, so that the moment is offset by occurring a magnetic force at both ends of each of the inner yokes 7. Therefore, tilt of the movable member 113 caused in the conventional objective lens actuating device can be suppressed.

Details will now be described. As shown in FIG. 4, it is assumed that the focusing coil 3 is set to be a N pole in a magnetized direction of the permanent magnets 10 fixed on surfaces facing the focusing coil 3 on the outer yoke 9. And the auxiliary permanent magnets 16 are fixed to both ends 7a of the tracking direction in the inner yoke 7 so that magnetized directions of the auxiliary permanent magnets 16 are opposite to magnetized directions of the permanent magnets 10 (magnetic force lines of magnetic fields occurred at the permanent magnets 10 of the outer yokes 9 are directed from an outside to an inside of the focusing coil 3, on the other hand, magnetic force lines of the auxiliary permanent magnets 16 are directed from the inside to the outside of the focusing coil 3), that is, an outside of the tracking direction is set to be the N pole.

When the movable member 113 is moved to a right direction for a tracking operation, the magnetic circuits 6 are shifted relatively to the movable member 113 towards a left direction. In this case, when the movable member 113 supplies current to the focusing coil 3 in a counterclockwise rotation so as to actuate the movable member 113 up in the focusing direction, the effect center of the actuating force of the focusing coil 3 is shifted from the gravity center G of the movable member 113 to a left side by an uneven force of the magnetic field distribution at the gaps 11 of the magnetic circuits 6. Thus, a moment is additionally applied to the movable member 113.

However, in the first embodiment, by providing the auxiliary permanent magnets 16, a magnet field causing a downward force in the focusing direction simultaneously affects a side surface of the focusing coil 3 in the tracking direction. In a case in which the movable member 113 is moved right, the auxiliary permanent magnets 16 on a left side approach the focusing coil 3 and magnetic flux on the left side crosses the focusing coil 3 more than the right side. Accordingly, the downward force on the left side is stronger and a moment from the downward force is opposite to the moment occurred by the magnetic flux at the gaps 11 of the magnetic circuit 6. Consequently, the moment of the permanent magnets 10 of the outer yokes 9 and the moment of the auxiliary permanent magnet 16 offset each other. Therefore, it is possible to prevent the movable member 113 from tilting.

Second Embodiment

Figure 5:
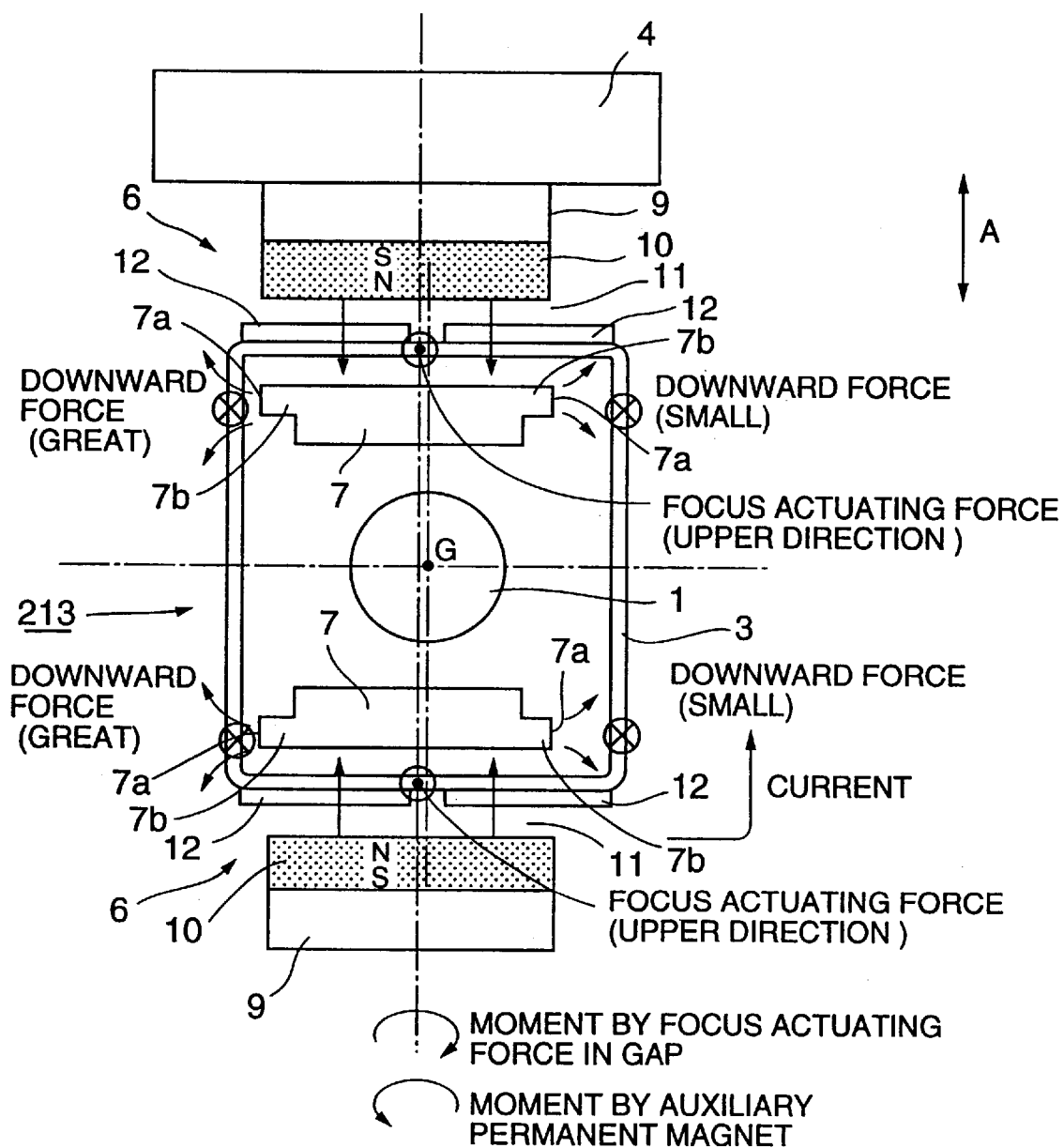
FIG. 5 is a diagram for explaining an occurrence state of a force in a case of placing an objective lens actuating device on a flat surface, according to a second embodiment of the present invention.

FIG. 5 is a diagram for explaining an occurrence state of a force in a case of placing an objective lens actuating device on a flat surface, according to a second embodiment of the present invention. Differently from the first embodiment, in the second embodiment, a thickness of both ends 7a of each of the inner yokes 7 is made thinner in the tracking direction to form thinner parts 7b, instead of the auxiliary permanent magnets 16 of the first embodiment.

In the second embodiment, the thinner parts 7b are formed on the inner yokes 7 to form both ends 7a to be thinner. Then, leaking magnetic flux can be utilized. That is, magnetic force lines occurred from N poles of the permanent magnets 10 fixed to the outer yokes 9 cross from the outside to the inside of the focusing coil 3 and are directed to the inner yoke 7. The both ends 7a of each of the inner yokes 7 is made thinner and then saturated magnetic flux leaks and directs from the inside to the outside of the focusing coil 3. This magnetic flux leak is has the same effect as the magnetic flux occurred by the auxiliary permanent magnets 16 of the first embodiment of the present invention.

Third Embodiment

Figure 6:
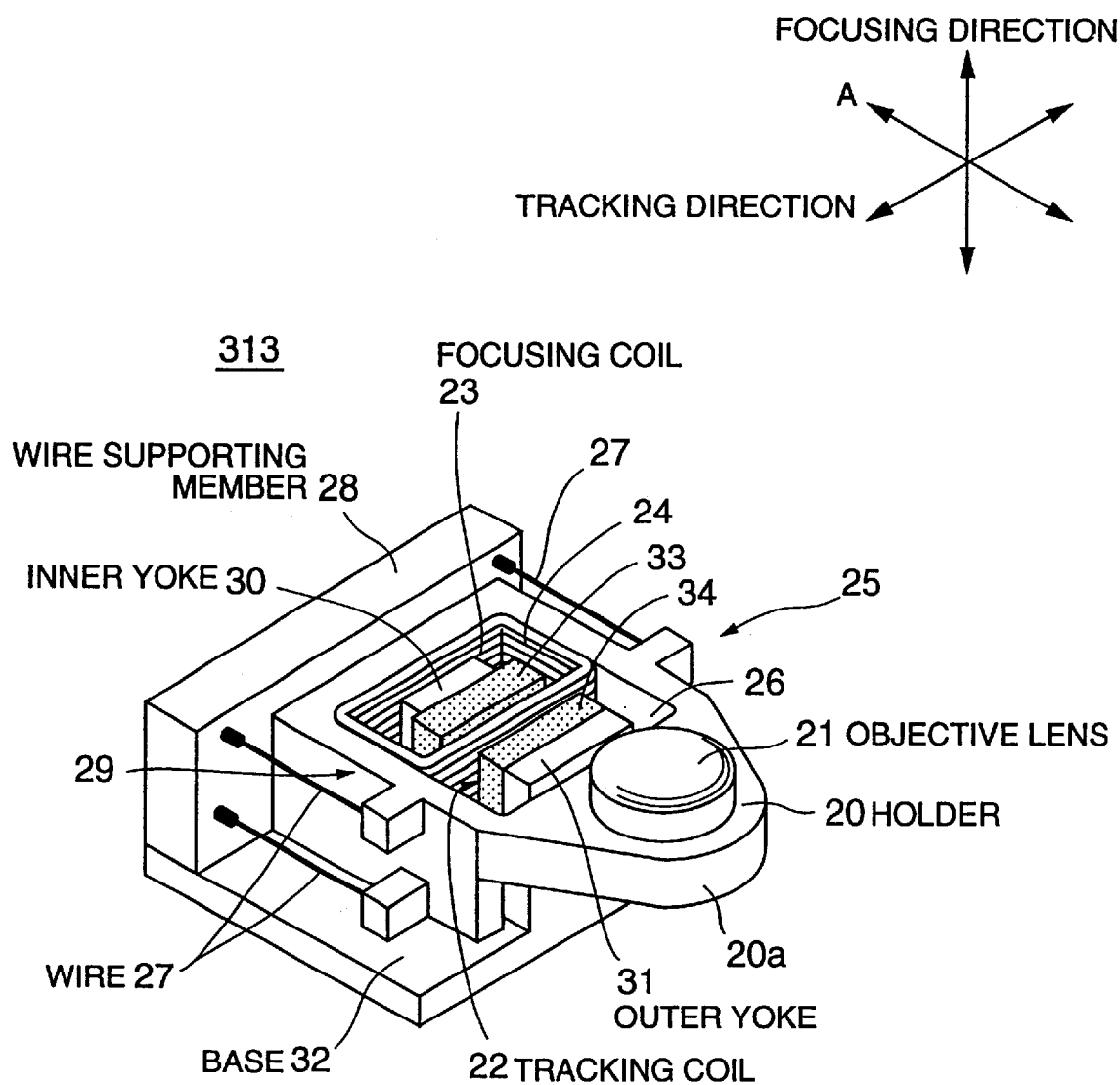
FIG. 6 is a perspective view of an entire of an objective lens actuating device according to a third embodiment of the present invention.
Figure 7:
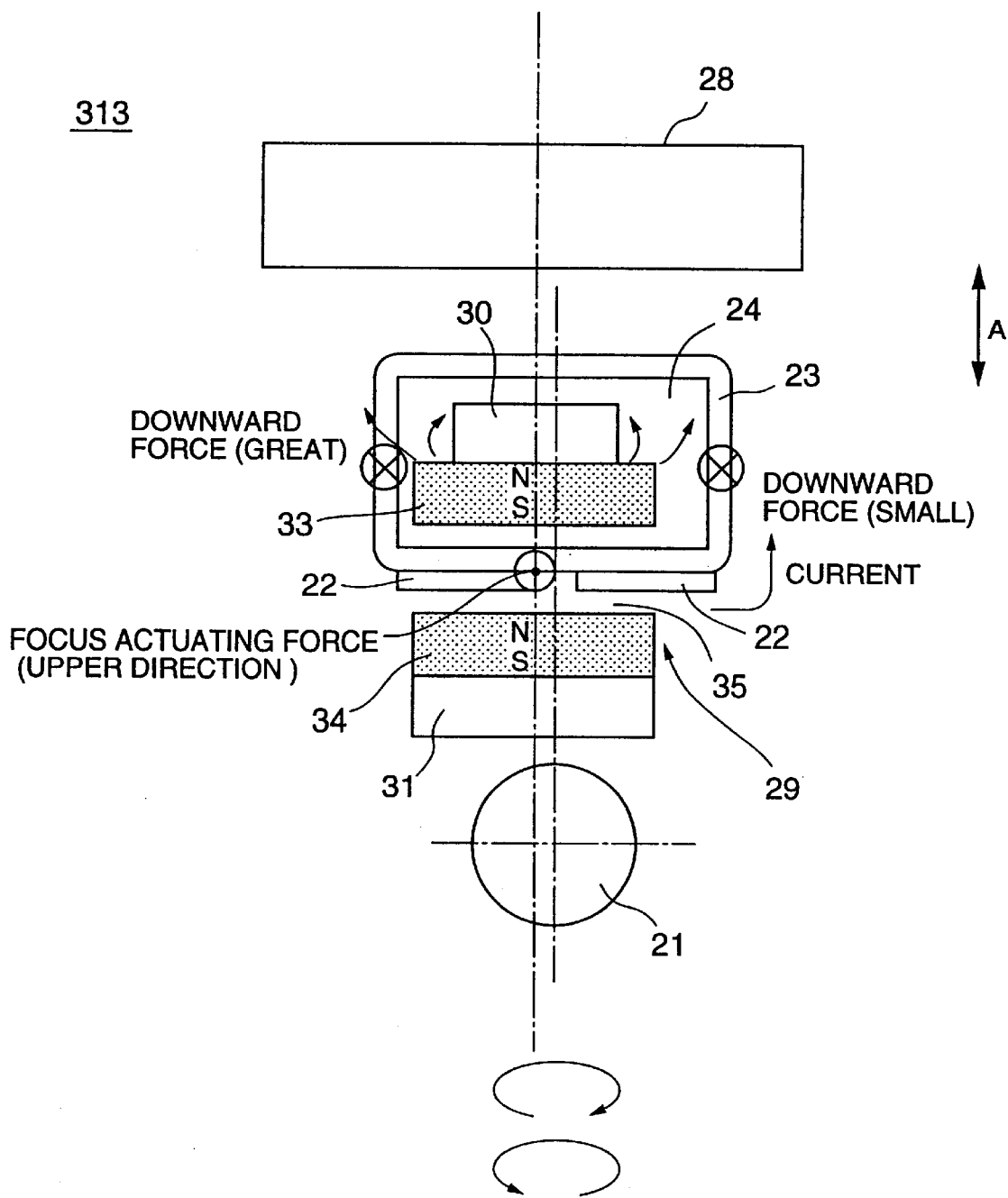
FIG. 7 is a diagram for explaining an occurrence state of a force in a case of placing the objective lens actuating device on a flat surface, according to the third embodiment of the present invention.

FIG. 6 is a perspective view of an entire of an objective lens actuating device according to a third embodiment of the present invention. FIG. 7 is a diagram for explaining an occurrence state of a force in a case of placing the objective lens actuating device 313 on a flat surface, according to the third embodiment of the present invention.

In FIG. 6, an objective lens 21 of the objective lens actuating device 313, the tracking coil 22, and the focusing coil 23 are arranged in order in the direction "A" perpendicularly crossing the focusing direction and the tracking direction in a holder 20 and are fixed to the holder 20. The tracking coil 22 including two flat coils is adhered and fixed on a surface facing of the focusing coil 23 at a side of an objective lens 21 in the direction "A", which tracking coil 22 is wound in a cylindrical shape in the optical axis direction of the objective lens 21.

The focusing coil 23 is adhered and fixed at an opposite side to the objective lens 21 in the direction "A" in an inner surface of an inside through hole 24 in the focusing direction of the holder 20. Therefore, in a movable member 25 including the holder 20, the objective lens 21, the tracking coil 22, and the focusing coil 23, two through holes are formed in the focusing direction. That is, the inside through hole 24 of the focusing coil 23 and a through hole 26 between the focusing coil 23, the tracking coil 22, and the objective lens 21. In the movable member 25, the holder 20 is movably supported by a wire supporting member 28 with four wires 27 in the focusing direction and the tracking direction, similarly to the first embodiment and the second embodiment of the present invention.

Magnetic circuit 29 includes an inner yoke 30 arranged inside the inside through hole 24 of the focusing coil 23, an outer yoke 31 arranged at through hole 26 between the focusing coil 23, the tracking coil 22, and the objective lens 21, a base 32 connecting the inner yoke 30 and the outer yoke 31, permanent magnets 33 and 34 that are fixed faced surfaces of the inner yoke 30 and the outer yoke 31, respectively, and that are magnetized so as that different magnetic poles face each other. And, actuating forces in the focusing direction and in the tracking direction are obtained by a magnetic field at a gap 35 provided between the permanent magnet 33 of the inner yoke 30 and the permanent magnet 34 of the outer yoke 31, and current flowing to the focusing coil 23 and the tracking coil 22.

In the third embodiment, a holder 20 mounting the objective lens 21 is projected in the holder 20, so that a standing mirror (not shown) can be arranged directly under the objective lens 21. Therefore, a thinner-sized objective lens actuating device can be realized. Differently from the first and the second embodiments, instead of arranging two magnetic circuits 6, the magnetic circuit 29 as a single magnetic circuit is arranged and the permanent magnets 33 and 34 are arranged to both the inner yoke 30 and the outer yoke 31 in order to obtain a desired actuating force by the magnetic circuit 29 alone.

Figure 9:
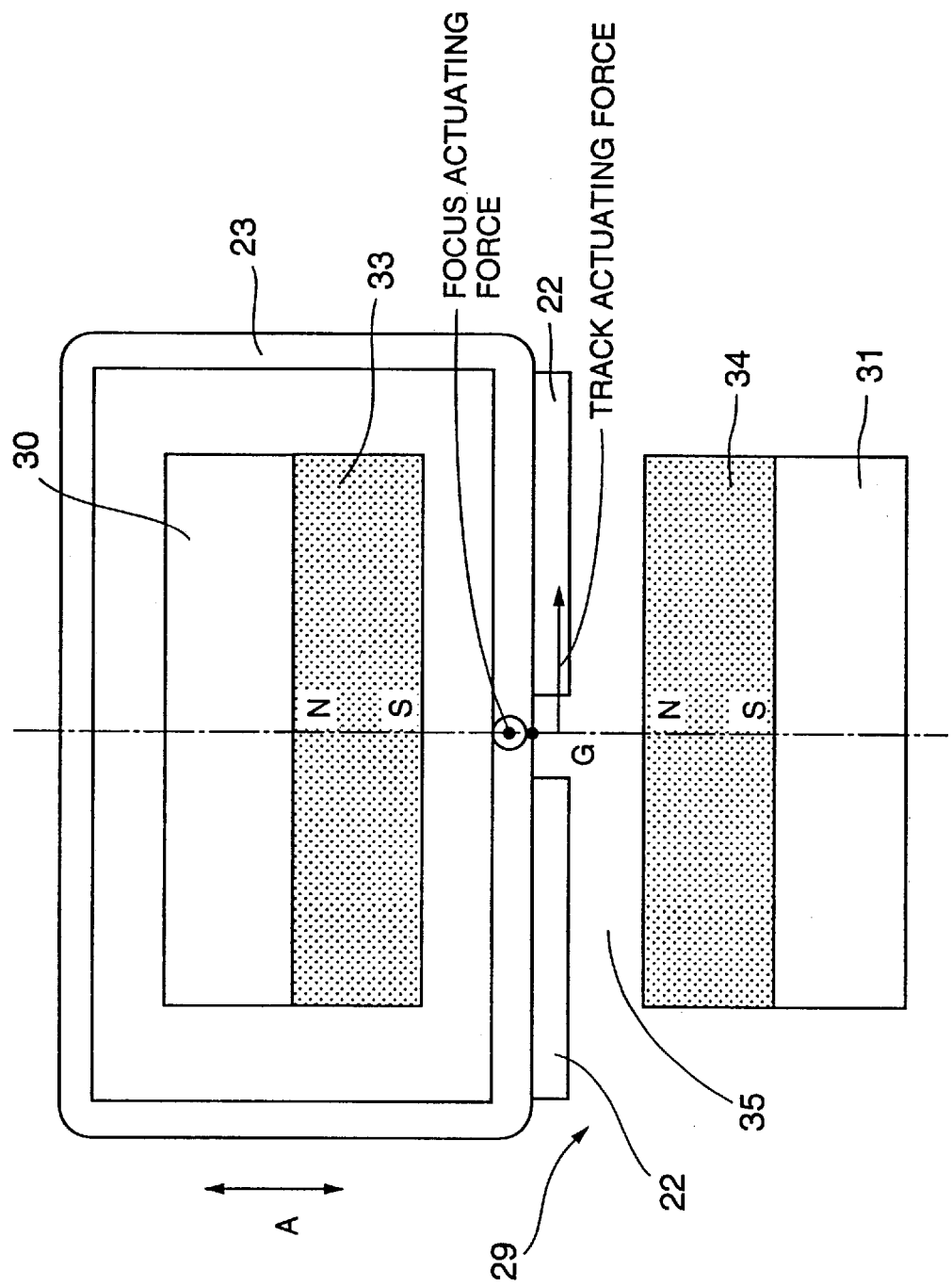
FIG. 9 is a diagram for explaining the occurrence state of the force in the case of placing the objective lens actuating device without an opposite actuating force to the focus actuating force on the flat surface.

In such as a configuration of the objective lens actuating device 313, generally, the gravity center G of the movable member 25 is positioned so that the tracking direction corresponds to the optical axis of the objective lens 21 and the direction "A" is arranged in the middle between the focusing coil 23 and the tracking coil 22. However, in this case of positioning the gravity center G of the movable member 25, as shown in FIG. 9, a location where the focus actuating force occurs in the direction "A" (a direction of a thickness of the focusing coil 23 in a gap 35 of the magnetic circuit 29 equals a center of the direction "A") is shifted from the gravity center G, and also a location where the track actuating force occurs in the direction "A" (a direction of a thickness of the tracking coil 22 equals a center of the direction "A") is shifted from the gravity center G. Thus, when the focus actuating force and the track actuating force are shifted from the gravity center G, an unwanted resonance is easily caused.

Figure 8:
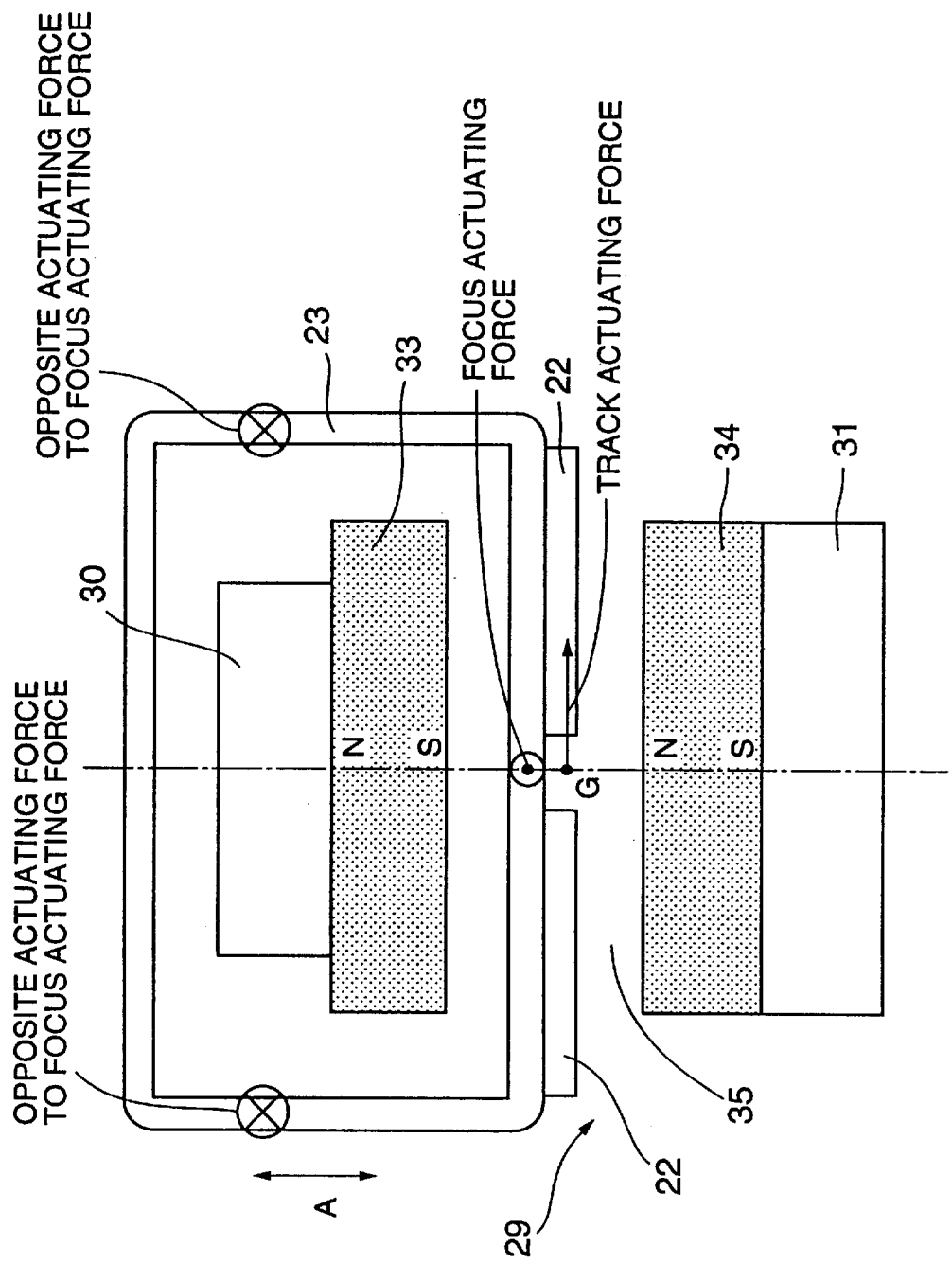
FIG. 8 is a magnified view for explaining the occurrence state of the force in the case of placing the objective lens actuating device with an opposite actuating force on the flat surface, according to the third embodiment of the present invention.

However, according to the third embodiment, as shown in FIG. 7 and FIG. 8, since opposite actuating forces are occurred in the gap 35 at a side surface of the focusing coil 23 in the tracking direction, an effect center of the focus actuating force is shifted towards an outer yoke 31. Accordingly, even if the track actuating force is corresponded so that the gravity center G is positioned at a center of the tracking coil 22, a shift from the focus actuating force can be suppressed.

In detail, as shown in FIG. 7, it is assumed that a surface, which faces the focusing coil 23, of the permanent magnet 34 fixed to the outer yoke 31 is a N pole (a surface fixed to the outer yoke 31 is a S pole) and a surface, which faces the focusing coil 23, of the permanent magnet 33 fixed to the inner yoke 30 is the S pole (a surface fixed to the inner yoke 30 is the N pole). Magnetic force lines emitted from a N pole surface of the permanent magnet 34 fixed to outer yoke 31 crosses a wire rod of the focusing coil 23 from an outside to an inside of the focusing coil 23 and enters a S pole surface of the inner yoke 30.

In a configuration shown in FIG. 7, a width in the tracking direction is narrower than that of the permanent magnet 33 fixed to the inner yoke 30 and the permanent magnet 33 is exposed in the tracking direction. The magnetic force lines output from the N pole surface, which is exposed in the tracking direction, crosses the wire rod of the focusing coil 23 from the inside to the outside of the focusing coil 23 in the tracking direction. This magnetic flux affects similarly to the magnetic flux output from an auxiliary permanent magnet 16 in the first embodiments and then cancels the moment. Therefore, it is possible to prevent the movable member 25 from being tilted.

In the embodiments described above, objective lens actuating devices 113, 213, and 313 which are a two-axes electromagnetic-actuator type for conducting a actuating control in two directions for the focusing operation and the tracking operation, are described. Alternatively, in an objective lens actuating device of a single-axis electromagnetic-actuating type in which only the focusing operation is conducted by electromagnetic means, the tracking operation can be conducted by other means such as a Galvano mirror. And by applying any one of similar configurations described in the embodiments, it is possible to prevent the focus actuating force from acting as the moment tilting the movable member by the shift caused by an assembly error related to the focusing coil and the magnetic circuits.

As described above, in the objective lens actuating device according to the present invention, a special member is not required to mount outside the objective lens actuating device and it is possible to cancel the moment caused by the shift of the focus actuating force by a displacement caused when the focusing coil and the magnetic circuits are assembled, and by the shift of the focus actuating force by a tracking movement in the focusing coil and the magnetic circuits. Also, it is not required to enlarge the objective lens actuating device and it is possible to prevent the objective lens from being tilted.

The present invention is not limited to the specifically disclosed embodiments, variations and modifications, and other variations and modifications may be made without departing from the scope of the present invention.

The present application is based on Japanese Priority Application No. 2000-378492 filed on Dec. 13, 2000, the entire contents of which are hereby incorporated by reference.

What is claimed is:

1. An objective lens actuating device comprising:
   a holder holding an objective lens in a focusing direction;
   a focusing coil cylindrically wound in an axis parallel with an optical axis of said objective lens and fixed on the holder;
   an inner yoke located inside said focusing coil;
   an outer yoke arranged to partially sandwich said focusing coil and face said inner yoke;
   a magnetic field generating part generating a magnetic field with said focusing coil in a gap formed by said inner and outer yokes; and
   an auxiliary magnetic field generating part generating an opposite magnetic field in respect to said magnetic field generated in the gap towards said focusing coil, at both ends of said inner yoke vertical to said focusing direction.

2. The objective lens actuating device according to claim 1, further comprising a supporting part movably supporting said holder at least in said focusing direction.

3. The objective lens actuating device according to claim 1, further comprising a connecting member connecting said inner yoke and said outer yoke.

4. The objective lens actuating device according to claim 1, wherein:
   said magnetic field generating part comprises a permanent magnet that is fixed on a flat surface of said outer yoke, said flat surface facing said inner yoke, and that is magnetized in a vertical direction in respect to said flat surface; and
   said auxiliary magnetic field generating part comprises an auxiliary permanent magnet that is fixed on said both ends of said inner yoke in a vertical direction in respect to said focusing direction and that is magnetized in a vertical direction in respect to said both ends.

5. The objective lens actuating device according to claim 1, wherein:
   said magnetic field generating part comprises a permanent magnet that is fixed on a flat surface of said outer yoke, said flat surface facing said inner yoke, and that is magnetized in a vertical direction in respect to said flat surface; and
   said auxiliary magnetic field generating part comprises both ends of said inner yoke, said both ends formed to be thinner so as to saturate said magnetic field caused by said permanent magnet at said both ends of said inner yoke in a direction perpendicularly crossing said focusing direction.

6. The objective lens actuating device according to claim 1, wherein:
said magnetic field generating part comprises:
a permanent magnet that is fixed on a flat surface of said outer yoke, said flat surface facing said inner yoke, and that is magnetized towards a single direction in a vertical direction in respect to said flat surface; and
a permanent magnet that is fixed on a flat surface of said inner yoke and that is magnetized towards said single direction; and
wherein said auxiliary magnetic field generating part comprises a width of said inner yoke in a direction perpendicularly crossing said focusing direction, said width formed to be narrower than a width of said permanent magnet fixed to said inner yoke.

7. An objective lens actuating device comprising:
an objective lens adapted to being held in a focusing direction;
a focusing coil cylindrically wound in an axis parallel with an optical axis of said objective lens;
an inner yoke located inside said focusing coil;
an outer yoke partially sandwiching said focusing coil and facing said inner yoke;
a magnetic field generating part adapted to generate a first magnetic field with said focusing coil in a gap formed by said inner and outer yokes; and
an auxiliary magnetic field generating part adapted to generate a second magnetic field opposite said first magnetic field at both ends of said inner yoke vertical to said focusing direction.

8. The objective lens actuating device according to claim 7, further comprising a supporting part movably supporting said holder at least in said focusing direction.

9. The objective lens actuating device according to claim 7, further comprising a connecting member connecting said inner yoke and said outer yoke.

10. The objective lens actuating device according to claim 7, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises an auxiliary permanent magnet that is fixed on said both ends of said inner yoke in a vertical direction in respect to said focusing direction and that is magnetized in a vertical direction in respect to said both ends.

11. The objective lens actuating device according to claim 7, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises both ends of said inner yoke, said both ends formed to be thinner so as to saturate said magnetic field caused by said permanent magnet at said both ends of said inner yoke in a direction perpendicularly crossing said focusing direction.

12. The objective lens actuating device according to claim 7, wherein:
said magnetic field generating part comprises:
a permanent magnet that is fixed on a flat surface of said outer yoke, said flat surface facing said inner yoke, and that is magnetized towards a single direction in a vertical direction in respect to said flat surface; and
a permanent magnet that is fixed on a flat surface of said inner yoke and that is magnetized towards said single direction; and
wherein said auxiliary magnetic field generating part comprises a width of said inner yoke in a direction perpendicularly crossing said focusing direction, said width formed to be narrower than a width of said permanent magnet fixed to said inner yoke.

13. An objective lens actuating device comprising:
a holder holding an objective lens in a focusing direction and in a tracking direction;
a focusing coil cylindrically wound in an axis parallel with an optical axis of said objective lens and fixed on the holder;
an inner yoke located inside said focusing coil;
an outer yoke arranged to partially sandwich said focusing coil and face said inner yoke;
a magnetic field generating part generating a magnetic field with said focusing coil in a gap formed by said inner and outer yokes; and
an auxiliary magnetic field generating part generating an opposite magnetic field in respect to said magnetic field generated in the gap towards said focusing coil, at both ends of said inner yoke vertical to said focusing direction.

14. The objective lens actuating device according to claim 13, further comprising a supporting part movably supporting said holder at least in said focusing direction.

15. The objective lens actuating device according to claim 13, further comprising a connecting member connecting said inner yoke and said outer yoke.

16. The objective lens actuating device according to claim 13, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises an auxiliary permanent magnet that is fixed on said both ends of said inner yoke in a vertical direction in respect to said focusing direction and that is magnetized in a vertical direction in respect to said both ends.

17. The objective lens actuating device according to claim 13, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises both ends of said inner yoke, said both ends formed to be thinner so as to saturate said magnetic field caused by said permanent magnet at said both ends of said inner yoke in a direction perpendicularly crossing said focusing direction.

18. The objective lens actuating device according to claim 13, wherein:
said magnetic field generating part comprises:
a permanent magnet that is fixed on a flat surface of said outer yoke, said flat surface facing said inner yoke, and that is magnetized towards a single direction in a vertical direction in respect to said flat surface; and
a permanent magnet that is fixed on a flat surface of said inner yoke and that is magnetized towards said single direction; and
wherein said auxiliary magnetic field generating part comprises a width of said inner yoke in a direction perpendicularly crossing said focusing direction, said width formed to be narrower than a width of said permanent magnet fixed to said inner yoke.

19. An objective lens actuating device comprising:
an objective lens adapted to being held in a focusing direction and a tracking direction;
a focusing coil cylindrically wound in an axis parallel with an optical axis of said objective lens;
an inner yoke located inside said focusing coil;
an outer yoke partially sandwiching said focusing coil and facing said inner yoke;
a magnetic field generating part adapted to generate a first magnetic field with said focusing coil in a gap formed by said inner and outer yokes; and
an auxiliary magnetic field generating part adapted to generate a second magnetic field opposite said first magnetic field at both ends of said inner yoke vertical to said focusing direction.

20. The objective lens actuating device according to claim 19, further comprising a supporting part movably supporting said holder at least in said focusing direction.

21. The objective lens actuating device according to claim 19, further comprising a connecting member connecting said inner yoke and said outer yoke.

22. The objective lens actuating device according to claim 19, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises an auxiliary permanent magnet that is fixed on said both ends of said inner yoke in a vertical direction in respect to said focusing direction and that is magnetized in a vertical direction in respect to said both ends.

23. The objective lens actuating device according to claim 19, wherein:
said magnetic field generating part comprises a permanent magnet that is fixed on a flat surface of said outer yoke, said flat surface facing said inner yoke, and that is magnetized in a vertical direction in respect to said flat surface; and
said auxiliary magnetic field generating part comprises both ends of said inner yoke, said both ends formed to be thinner so as to saturate said magnetic field caused by said permanent magnet at said both ends of said inner yoke in a direction perpendicularly crossing said focusing direction.

24. The objective lens actuating device according to claim 19, wherein:
said magnetic field generating part comprises:
a permanent magnet that is fixed on a flat surface of said outer yoke, said flat surface facing said inner yoke, and that is magnetized towards a single direction in a vertical direction in respect to said flat surface; and
a permanent magnet that is fixed on a flat surface of said inner yoke and that is magnetized towards said single direction; and
wherein said auxiliary magnetic field generating part comprises a width of said inner yoke in a direction perpendicularly crossing said focusing direction, said width formed to be narrower than a width of said permanent magnet fixed to said inner yoke.

* * * * *